United States Patent Office 2,830,635
Patented Apr. 15, 1958

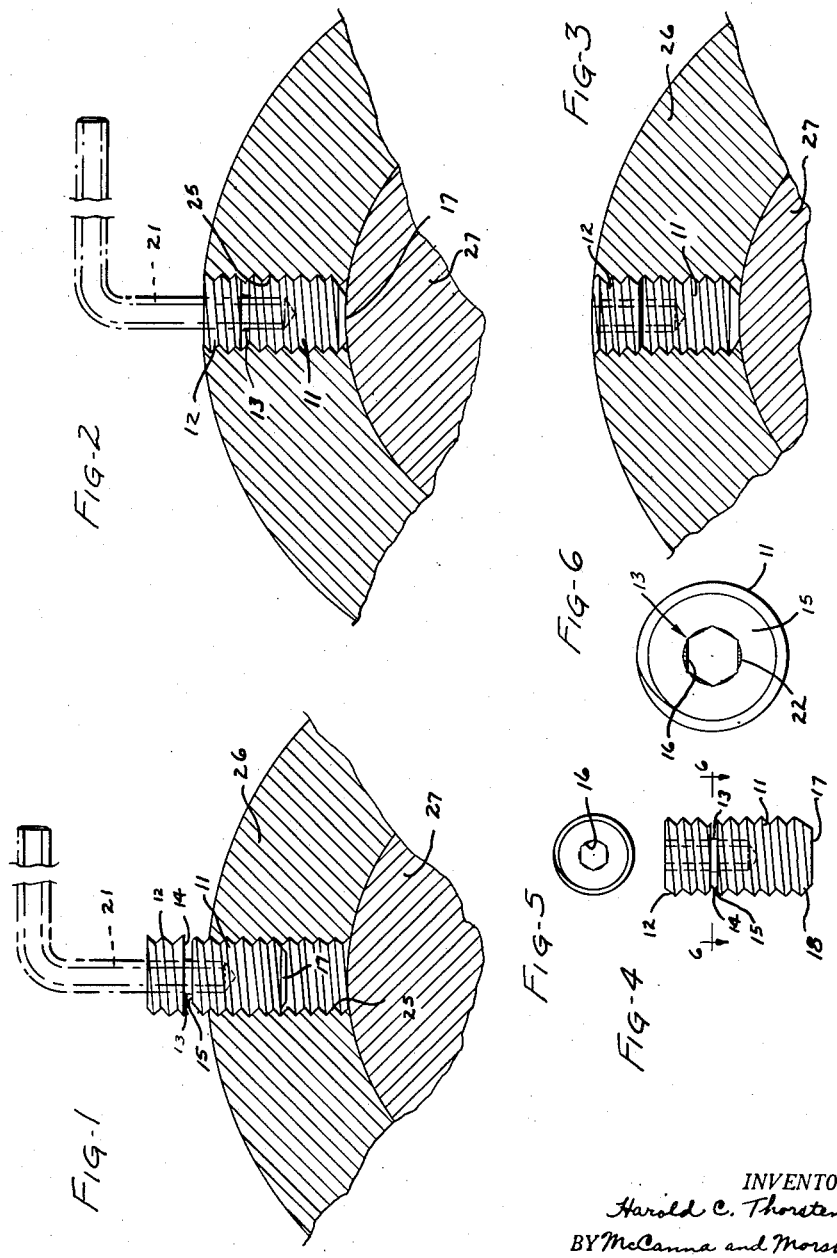

2,830,635

SELF-LOCKING SET SCREW HAVING FRANGIBLE INTERMEDIATE PORTION

Harold C. Thorstens, Rockford, Ill.

Application July 20, 1954, Serial No. 444,515

5 Claims. (Cl. 151—14)

This invention relates to set screws and more particularly to a frangible set screw.

An important object of the invention is the provision of a combination set screw having a work engaging portion and a jammable locking portion connected thereto by an integral frangible connector so that the combination set screw may be threaded as a unitary assembly into a bore; which combination set screw is so constructed that force may be applied during insertion of the set screw into a bore equally to both the locking portion and the work engaging portion whereby the frangible connector is not stressed during insertion and which is so arranged that force may thereafter be applied to the locking portion alone to fracture the frangible portion and tighten the locking portion against the work engaging portion.

Another object of this invention is the provision of a combination set screw which may be easily released without necessitating separate removal of either the locking portion or the work engaging portion, or which may be removed entirely from the bore and which does not damage the threads on the set screw or the threads in the bore.

Yet another object of this invention is the combination of a set screw in which the locking portion is constructed so that the forces applied thereto during insertion and removal may be applied throughout the axial length thereof, thereby minimizing breakage or fracturing of the locking portion and in which the locking portion protects the work engaging portion against corrosion and mutilation so that the latter may also easily be removed.

These, together with various ancillary objects and advantages of this invention will be more readily appreciated as the same becomes better understood by reference to the following detailed description when taken in connection with the accompanying drawings:

Figures 1, 2 and 3 are sectional views through a shaft and hub into which the set screw is inserted illustrating various stages of adjustment of the set screw into the threaded bore in the hub;

Fig. 4 is a side elevational view of the set screw;

Fig. 5 is an end elevational view of the set screw; and

Fig. 6 is a transverse sectional view taken on the plane 6—6 of Fig. 4.

As best shown in Fig. 4, the combination set screw of the present invention comprises a work engaging portion 11 and a locking portion 12 connected by an intermediate frangible portion 13, the work engaging portion and the locking portion of the set screw being externally threaded with the threads on the locking portion forming a continuation of the threads on the work engaging portion. Conveniently, a conventional set screw having an overall length equal to the combination set screw may be initially formed on a screw machine. Thereafter an annular groove is cut intermediate the ends of the set screw to separate the locking portion 12 from the work engaging portion 11 and form the frangible intermediate portion 13 which is adapted to be fractured after the work engaging portion has been turned into firm contact with the work whereby the end face 14 of the locking portion may be jammed against the registering face 15 of the work engaging portion. Preferably, the groove is located on the set screw to provide an elongated work engaging portion and a relatively shorter locking portion, as is clearly shown in the drawings.

The set screw is provided with an axial multisided socket 16 (see Figs. 5 and 6), here shown hexagonal in cross section, which extends through the locking portion 12, the intermediate portion 13 and into the work engaging portion 11, the socket terminating in spaced relation to the work engaging face 17 on the set screw to provide a closed end. The closed end is beveled at 18 to facilitate insertion of the set screw into the threaded bore and is formed with a suitable work engaging face of any desired configuration.

The socket 16 which extends through the locking portion, the intermediate portion and into the work engaging portion is arranged to receive a correspondingly shaped tool 21 (see Figs. 1 and 2) so that when the tool is inserted on the way into the socket, the locking portion is keyed to the working portion whereby the intermediate portion is not stressed during threading of the combination set screw into the threaded bore. Consequently, the intermediate portion may be formed with relatively thin walls having a strength sufficient only to withstand normal handling, which walls are consequently easily fractured to enable jamming of the locking portion against the work engaging portion. As best shown in Figs. 4 and 6, the groove in the set screw extends inwardly and intersects the corners of the hexagonal socket so that the intermediate connecting portion is in the form of a plurality of annularly spaced splints 22 formed integrally with the locking portion and the work engaging portion, the inner wall of the splints being formed by the multisided socket 12 and the outer wall of the splints being formed by the annular groove. The width of the groove is made less than the depth thereof so that the length of the splints 22, after the latter are fractured by relative turning between the locking portion and the work engaging portion, is insufficient to extend from the inner end of the groove to the threads on the periphery of the set screw. Consequently, those splints which are deflected outwardly between the registering faces 14 and 15, do not extend to the threaded periphery on the set screw where they could damage the threads in the bore into which the set screw is inserted.

When inserting the combination set screw into a threaded bore 25 formed in the work piece such as the collar 26, the tool 21 is inserted into the bore for the full depth thereof to thereby key the locking portion to the work engaging portion and prevent stressing of the frangible intermediate portion 13. The set screw is then threaded until the working face 17 on the set screw is in firm contact with the work such as the shaft 27, as is clearly shown in Fig. 2. The tool is then partially retracted from the socket 16 so that it extends only into the locking portion whereby subsequent turning of the tool fractures the frangible intermediate portion of the set screw and effects jamming of the face 14 of the locking portion 12 against the registering face 15 on the work engaging portion 11, as is shown in Fig. 3. Since the splints are separate from each other, they are independently movable after being fractured and are not retained in the form of an annular ring between the locking portion and the work engaging portion. The splints, being very thin, tend to be deflected laterally as the locking portion is turned toward the work engaging portion and those splints which are deflected outwardly between the registering faces 14 and 15 will thus lie flat between those faces with the flat side of each splint contacting one face and the arcuate side of the splint engaging the other face. The sides of the splints provide a large contact area between the splints and the registering faces 14 and 15, and since the opposed sides of the splints are smooth, there are no jagged edges which inhibit proper tightening of the locking portion against the work engaging portion. Further, since the splints are deflected outwardly instead of being retained in an annular ring, the points of contact between the opposed sides of the splints and the registering faces 14 and 15 are located outwardly from the edge of the socket thereby providing increased resistance to unthreading of the locking portion. As the frangible splints 22 are spaced inwardly from the periphery of the set screw a distance greater than the length of the splints, the splints, upon fracturing, do not become embedded in the threads in the bore into which the set screw is inserted so that the threads in the bore and the threads in the set screw are not damaged during insertion or removal of the set screw. Consequently, the set screw may be released and reused many times.

When removing the set screw from the bore, or when releasing the set screw, it is only necessary to partially insert the tool 21 into the locking portion to release the same, and thereafter fully insert the tool the full depth of the socket whereby the locking portion and the work engaging portion may be simultaneously released or retracted from the bore. Since the socket extends through the full length of the locking portion, it is apparent that torsion may be uniformly applied along the entire axis thereof to retract the same, thereby minimizing the tendency of the locking portion of the set screw to break or fracture during removal. Since the locking portion protects the work engaging portion from corrosion and mutilation, it is apparent that the work engaging portion may also be easily removed, even after long periods of use under adverse conditions.

The combination set screw thus combines, in a unitary assembly, a conventional set screw and a locking set screw. It is therefore necessary to handle and insert only a single item, thereby reducing the number of parts which must be handled and materially simplifying the use thereof.

Although a single preferred embodiment of the invention has been illustrated and described, it is apparent that various changes may be made in the size and shape of the elements without departing from the scope of the invention as defined in the claims.

I claim:

1. A set screw comprising an integral body having a polygonal socket extending axially inwardly from one end thereof for the reception of a tool, said body being externally threaded and having an annular groove formed in the external periphery thereof and located intermediate the ends of said socket and defining spaced end portions and a reduced diameter intermediate portion connecting said end portions, said groove intersecting the corners of said polygonal socket to define a plurality of annularly spaced splints interconnecting the end portions of the set screw adapted to fracture when one end portion is turned relative to the other, said splints having a transversely arcuate outer wall disposed coaxial with said socket and a substantially flat inner surface extending secantially of the outer surface, said splints having a maximum radial thickness which is small as compared to the length thereof.

2. A set screw comprising a body having an axial multi-sided socket extending inwardly from one end thereof for the reception of a tool, said body being externally threaded and having an annular groove in the external periphery thereof intermediate the ends of said socket, said groove having a uniform axial width from the radially inner edge to the raidally outer edge thereof and defining opposed parallel faces on said body, said groove terminating at its inner end in a substantially cylindrical wall extending axially of said body between said opposed faces and disposed radially inwardly of the corners of said socket and radially outwardly of the flats of said socket to define a thin frangible midsection on the body, said midsection having a maximum radial thickness which is small as compared to the lead of the threads on said body and adapted to fracture and substantially completely break away from both end portions of the body when one end portion is turned relative to the other end portion whereby the end portions of the body are adapted to be tightened into substantially face-to-face contact.

3. A set screw comprising an integral body having first and second externally threaded end portions, a reduced diameter frangible intermediate portion connecting said end portions, said body having a multi-sided socket extending axially through said first end portion and through said intermediate portion and into said second end portion for the reception of a tool, said end portions having flat parallel end faces on the registering ends thereof extending radially outwardly from said intermediate portion to the threaded periphery of the body, said intermediate portion having a substantially cylindrical outer wall extending between said flat end faces, said outer wall having a radius greater than the radial spacing of the flats of the multi-sided socket from the axis of the body and less than the radial spacing of the corners of the multi-sided socket from the axis of the body and defining splints connecting said end portions of the body and each having an arcuate outer surface coaxially of the body and a substantially flat inner surface extending secantially of said outer surface, said splints having a maximum radial thickness which is small as compared to the lead of the threads on said body and adapted to fracture and substantially completely break away from both end portions of the body when one end portion is turned relative to the other whereby the end portions are adapted to be tightened into substantially face-to-face contact.

4. A set screw comprising an integral body having first and second externally threaded end portions and a reduced diameter frangible intermediate portion connecting said end portions, a hexagonal socket extending axially through said first end portion and through said intermediate portion and into said second end portion for the reception of a tool, said end portions having flat parallel faces on the registering ends thereof extending radially outwardly from said intermediate portion to the threaded periphery of said body, said intermediate portion having a substantially cylindrical outer wall extending between said flat end faces, said outer wall having a radial spacing from the axis of said body greater than the radial spacing of the flats of said socket and less than the radial spacing of the corners of said socket and defining splints connecting said end portions of the body and each having an arcuate outer surface disposed coaxially of the body and a substantially flat inner surface extending secantially of the outer surface, said splints having a maximum radial thickness which is small as compared to the axial length thereof whereby said splints are adapted to fracture when the end portions are turned relative to each other and deflect laterally as end portions are tightened together whereby the end portions are adapted to be tightened into substantially face-to-face contact.

5. A set screw comprising a body having an axial hexagonal socket extending inwardly from one end thereof for the reception of a tool, said body being externally threaded and having an annular groove in the external periphery thereof intermediate the ends of said socket, said groove having a uniform axial width and defining flat parallel faces on the end portions of said body, said groove intersecting the corners of said socket and terminating at its inner end in a substantially cylindrical wall extending axially between said opposed faces and defining splints connecting the end portions of the body, said splints having an arcuate outer wall disposed coaxially of said body and a substantially flat inner wall extending secantially of the outer wall, said splints having a maximum radial thickness which is small as compared to the lead of the threads on said body and less than the axial length of said splints whereby said splints are adapted to fracture and deflect laterally when the end portions are turned relative to each other, the length of said splints being less than the radial spacing between the splints and the periphery of the screw.

References Cited in the file of this patent

UNITED STATES PATENTS

| | | |
|---|---|---|
| 791,548 | Fischer | June 6, 1905 |
| 1,380,395 | Korach | June 7, 1921 |
| 1,457,749 | Rast | June 5, 1923 |
| 2,572,613 | Goff | Oct. 23, 1951 |